US008406736B2

(12) United States Patent
Das et al.

(10) Patent No.: US 8,406,736 B2
(45) Date of Patent: Mar. 26, 2013

(54) SYSTEM AND METHOD FOR IDENTIFYING AND LOCATING WIRELESS DEVICES THAT ARE BEING OPERATED BY UNAUTHORIZED USERS

(75) Inventors: Indrajitkumar Das, Bangalore (IN); Chitra Kumar, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 515 days.

(21) Appl. No.: 12/346,179

(22) Filed: Dec. 30, 2008

(65) Prior Publication Data

US 2010/0167753 A1 Jul. 1, 2010

(51) Int. Cl.
*H04M 3/16* (2006.01)
(52) U.S. Cl. ............... 455/410; 455/411; 455/414.1; 455/456.1; 455/418; 455/556.1; 340/5.31
(58) Field of Classification Search .............. 340/5.31; 455/410, 411, 414.1, 418, 556.1, 456.1
See application file for complete search history.

(56) References Cited

U.S. PATENT DOCUMENTS

| | | | |
|---|---|---|---|
| 5,748,084 A | 5/1998 | Isikoff | |
| 6,243,039 B1 | 6/2001 | Elliot | |
| 7,135,967 B2 * | 11/2006 | Culpepper et al. | 340/539.21 |
| 7,274,939 B2 | 9/2007 | Ruutu et al. | |
| 7,278,025 B2 | 10/2007 | Saito et al. | |
| 8,244,211 B2 * | 8/2012 | Clark | 455/411 |
| 2002/0077080 A1 * | 6/2002 | Greene | 455/412 |
| 2005/0275543 A1 * | 12/2005 | Hisano | 340/573.1 |
| 2006/0293892 A1 | 12/2006 | Pathuel | |
| 2007/0093234 A1 * | 4/2007 | Willis et al. | 455/410 |
| 2007/0189588 A1 | 8/2007 | Kim et al. | |
| 2008/0130957 A1 * | 6/2008 | Small | 382/115 |
| 2009/0100168 A1 * | 4/2009 | Harris | 709/224 |
| 2009/0190802 A1 * | 7/2009 | Adams et al. | 382/115 |
| 2009/0247122 A1 * | 10/2009 | Fitzgerald et al. | 455/410 |
| 2009/0251282 A1 * | 10/2009 | Fitzgerald et al. | 340/5.31 |
| 2009/0253406 A1 * | 10/2009 | Fitzgerald et al. | 455/410 |
| 2009/0253408 A1 * | 10/2009 | Fitzgerald et al. | 455/411 |
| 2009/0253410 A1 * | 10/2009 | Fitzgerald et al. | 455/411 |
| 2010/0263038 A1 * | 10/2010 | Nagatomo | 726/9 |
| 2010/0273452 A1 * | 10/2010 | Rajann et al. | 455/411 |
| 2011/0141276 A1 * | 6/2011 | Borghei | 348/143 |
| 2011/0191840 A1 * | 8/2011 | Ortiz et al. | 726/7 |

FOREIGN PATENT DOCUMENTS

WO 2009122295 10/2009

OTHER PUBLICATIONS

International Search Report and Written Opinion dated Apr. 12, 2010 in related case PCT/US2009/069014.
International Preliminary Report on Patentability and Written Opinion for International Patent Application No. PCT/US2009/069014 issued on Jul. 5, 2011.

* cited by examiner

*Primary Examiner* — Kamran Afshar
*Assistant Examiner* — Mong-Thuy Tran

(57) ABSTRACT

A method of locating a wireless device being operated by an unauthorized user is provided. The method comprises examining biometric information of an operator of the wireless device, determining if the operator is authorized based on the biometric information, and transmitting a message to a remote recipient in response to determining the operator is not authorized. In certain embodiments, the message can include the location of the wireless device.

22 Claims, 2 Drawing Sheets

SYSTEM AND METHOD FOR IDENTIFYING AND LOCATING WIRELESS DEVICES THAT ARE BEING OPERATED BY UNAUTHORIZED USERS

TECHNICAL FIELD

Embodiments of the subject matter described herein relate generally to wireless devices. More particularly, embodiments of the subject matter relate to self-detection of the theft of a wireless device and location reporting.

BACKGROUND

Mobile wireless devices, such as cellular phones, are conveniently portable and easy to carry around. Because of their portable nature, they are also susceptible to theft and difficult to recover once stolen.

Some types of wireless devices employ authentication techniques to verify that a person using the device is an authorized operator. For example, cellular phones can lock their interface, removing the ability for a person to use the device, unless or until an authentication measure is successfully performed. One such authentication measure is the entry of a pre-established code, such as a personal identification number. Another authentication measure sometimes used is biometrics to determine that a potential operator of the device is authorized one.

Such authentication measures render the wireless device inoperative to a thief after it has been stolen. They do not actively prevent or inhibit theft of the device. By preventing an unauthorized user from, for example, placing calls with a stolen cellular phone, however, they reduce the likelihood that the rightful owner will be charged for potentially expensive charges incurred by the thief. Additionally, widespread knowledge of the uselessness of theft of such devices can operate as a deterrent, making such theft futile and reducing the incidence rate. Such locking techniques, however, do not assist the rightful owner in recovering the stolen device.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to cellular data transmission, cellular communication protocols, wireless communication system architectures, Global Positioning System (GPS) components, biometric data collection and analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
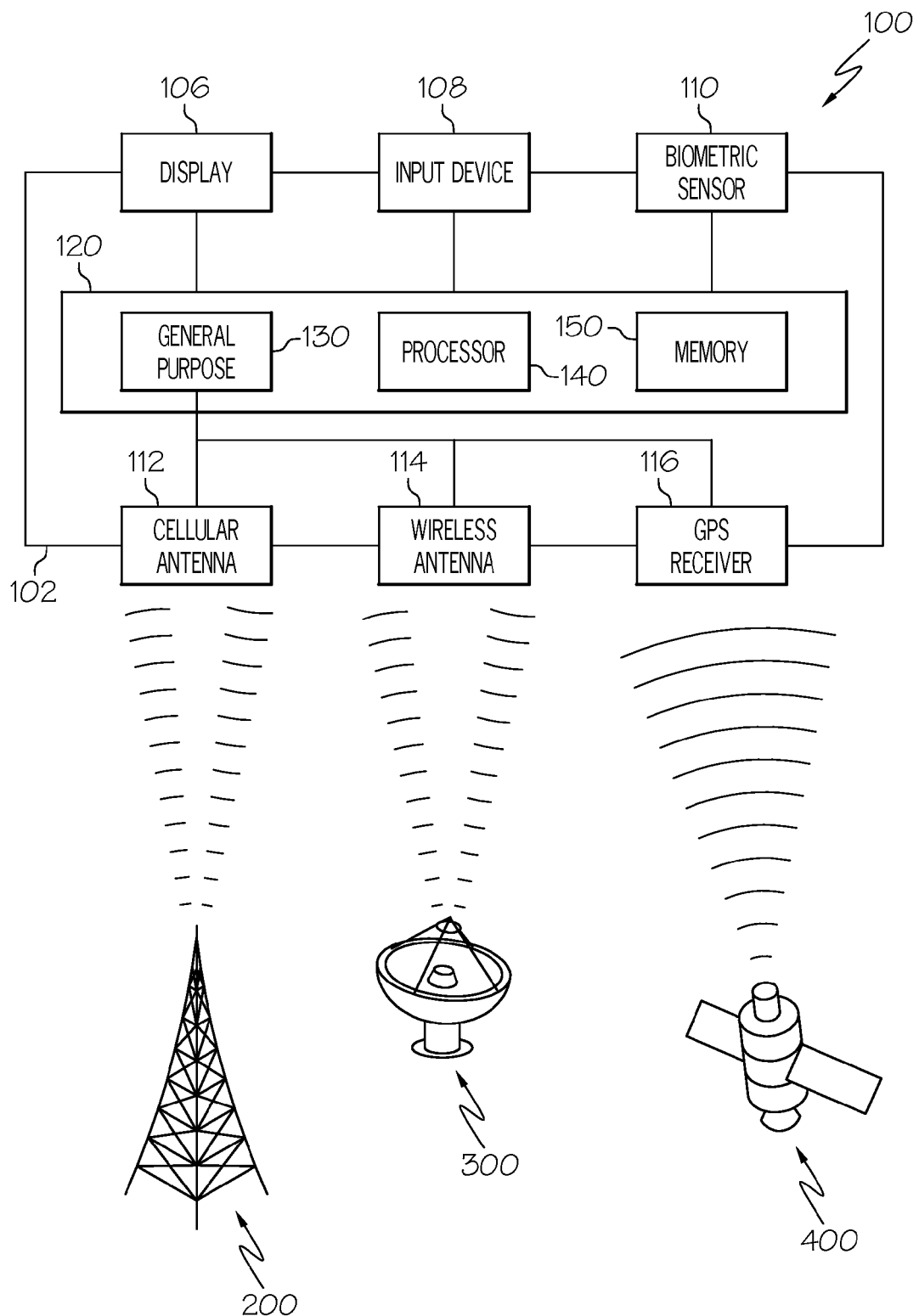
FIG. 1 is a schematic diagram of an embodiment of a wireless device and remote communication sources.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, although the schematic shown in FIG. 1 depicts one example arrangement of components of a wireless device, additional intervening elements, devices, features, or components may be present in an embodiment of the invention. Additionally, while FIG. 1 describes certain features of the wireless device 100 in the exemplary embodiment of a cellular phone, other wireless devices are contemplated, including portable media devices with wireless communications capabilities for example.

To detect the theft of a wireless device, the wireless device can operate a biometric sensor for purpose of authorizing a potential operator of the device. In the event that a potential operator is unauthorized, the wireless device can determine its current location using any of several techniques and transmit a message indicating the event of unauthorized use as well as the location of the device to a trusted, remote recipient.

FIG. 1 is a schematic representation of a wireless device 100, which is configured in accordance with an exemplary embodiment, communicating with a cellular communication antenna 200, a wireless network system 300, and a GPS satellite 400. The wireless device 100 is depicted in an oversimplified manner, and a practical embodiment can include many additional features and components. The wireless device 100 generally includes a housing 102, a display element 106 that is visible from the outside of the housing 102, an input device 108, at least one biometric sensor 110 (both the input device 108 and biometric sensor 110 are preferably accessible from the outside of the housing 102), an electronics module 120 contained within the housing 102, a cellular antenna 112, a wireless antenna 114, and a GPS receiver 116 (any of the cellular antenna 112, wireless antenna 114 and GPS receiver 116 can be, but are not necessarily, contained within the housing 102). The input device 108 is preferably a keypad suitable for use with the wireless device 100. Other components, including imaging devices, speaker and/or microphone devices, and such components found in wireless devices can also be present in certain embodiments, either alone or in various combinations.

The display 106 and input device 108 function as input/output elements for the operator of the wireless device 100. The display 106 and input device 108 can be coupled to the electronics module 120 as necessary to support input/output functions in a conventional manner. The electronics module 120 represents the hardware components, logical components, and software functionality of the wireless device 100. In practical embodiments, the electronics module 120 can be physically realized as an integrated component, board, card, or package mounted within the housing 102. As depicted in FIG. 1, the electronics module 120 can be coupled to the cellular antenna 112, the wireless antenna 114, and the GPS receiver 116 using suitable techniques.

The electronics module 120 may generally include a number of sub-modules, features, and components configured to support the functions described herein. For example, the electronics module 120 may include a general purpose sub-module 130, at least one processor 140, and memory 150. The distinct functional blocks of FIG. 1 are useful for purposes of description. In a practical embodiment, the various sub-modules and functions need not be distinct physical or distinct functional elements. In other words, these (and other) functional modules of the wireless device 100 may be realized as combined processing logic, a single application program, or the like.

The biometric sensor 110 is suitably configured to support biometric input functions of the wireless device 100. In this regard, the biometric sensor 110 can include an optical, tactile, and/or other sub-sensors adapted to examine any of a variety of biometric signatures of an operator of the wireless device 100. In the exemplary embodiment described herein, the biometric sensor 110 is a fingerprint scanner, though other sensors, such as optical scanners, retinal scanners, voiceprint elements and processors, and video/image processors, for example, can also be used. Preferably, the biometric sensor 110 is coupled to the electronics module 120 for purpose of sensing biometric data and providing it to the electronics module 120 for examination and subsequent actions. The operation of biometric sensors is generally known and, therefore, will not be described in detail herein.

The general purpose sub-module 130 is responsible for handling functions of the wireless device 100, as needed. For example, the general purpose sub-module 130 may include a wireless data communication element that supports uni- or bi-directional wireless data transfer using suitable wireless data transmission protocols and methodologies, including, for example cellular communication signals, GPS signals, and other wireless transmission techniques, such as short-range wireless signals and radio signals. Alternatively (or additionally), the general purpose sub-module 130 can be configured to support data communication over physical connections, as appropriate to the embodiment.

As another example, the general purpose sub-module 130 may be configured to support data exchange functions of wireless device 100, where such data exchange functions include biometric information capture; imaging; cellular communication, wireless network communication; GPS data receiving; and so on. These data exchange modes can be utilized to support traditional uses of the wireless device 100, e.g., verbal communication, textual communication, media presentation, and other applications. Although not separately depicted in FIG. 1, the wireless device 100 can include one or more data exchange sub-modules that are configured to support such data exchange activities.

The processor 140 can be any general purpose microprocessor, controller, or microcontroller that is suitably configured to control the operation of the wireless device 100. In practice, the processor 140 executes one or more software applications that provide the desired functionality for the wireless device 100, including the operating features described in more detail below. The memory 150 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As an example, the memory 150 is capable of storing RFID data captured by the wireless device 100.

A wireless device, such as the one described above, preferably is capable of functioning in one or more alternate modes, including cellular communication mode, GPS receiving mode, and so on. The wireless device can be capable of multi-tasking and multi-functioning. A wireless device, such as the one described above, is preferably used as in conjunction with the systems and methods described below.

The cellular communication antenna 200 can be any communications station adapted to receive and transmit signals appropriate for use in exchanging data between a cellular phone, such as the wireless device 100, and other nodes on the cellular network, either through wireless or physical connection. The cellular communication antenna 200 preferably includes data exchange with a cellular system adapted to perform tracking services. Tracking services are well-known in the art, and permit a cellular network to approximate the location of a cellular phone in communication with the network. In addition, certain data regarding the location of the cellular phone's location can be communicated to the cellular phone, including the identity of the nearest cellular communication antenna 200 with which the cellular phone preferably communicates.

The wireless network system 300 represents any wireless communication in which the wireless device 100 can participate. Some examples can include local area networks (LANs) operating under the IEEE 802.11x family of protocols. Other examples can include radio-frequency communication or short-range communication conforming to the BLUETOOTH™ standard.

The GPS satellite 400 illustrates any available GPS satellite providing a signal to the wireless device 100. Although only one GPS satellite 400 is shown, more can be transmitting signals to the wireless device 100, as preferable for operation of GPS techniques.

Preferably, the wireless device 100 is capable of transmitting and/or receiving information to or from any of the illustrated remote systems as appropriate to the operation of the wireless device 100. For example, when used to place a verbal call, the wireless device 100 preferably communicates with the cellular communication antenna 200 using its cellular antenna 112. Similarly, the wireless device 100 can also receive GPS signals from the GPS satellite 400 for purposes of determining its location. The wireless device 100 can perform any or all of these operations simultaneously or in a sequence controlled by the electronics module 120.

Figure 2:
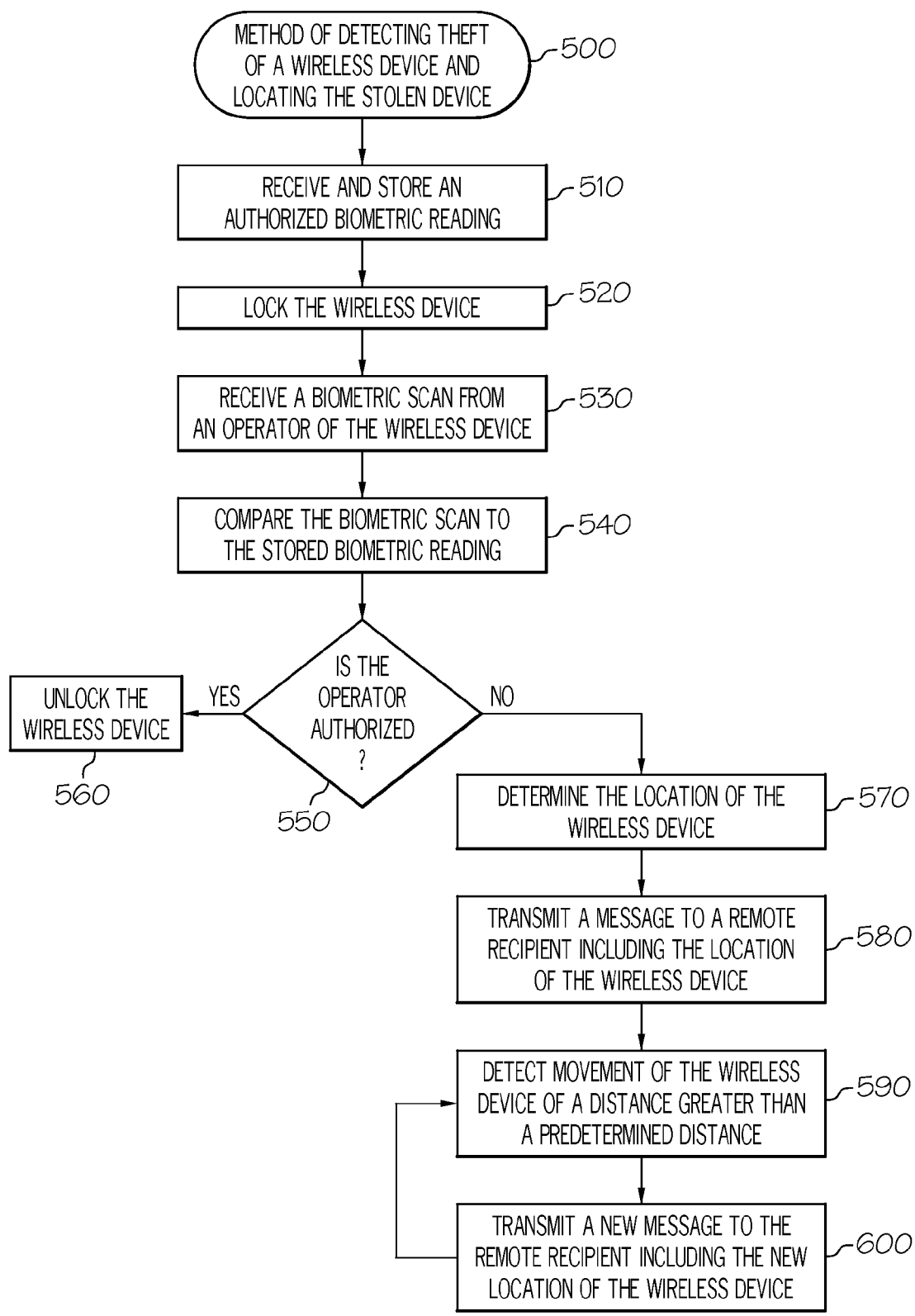
FIG. 2 is a schematic illustration of a method of detecting the theft of a wireless device and locating the wireless device.

FIG. 2 illustrates a method of detecting theft or unauthorized use of the wireless device 100. After detecting theft of the wireless device 100, the wireless device 100 can operate several of its components to determine its location and transmit a message to a designated recipient communicating the event of the theft and its current location, as described in greater detail below. The various tasks performed in connection with method 500 may be performed by software, hardware, firmware, or any combination thereof For illustrative purposes, the following description of method 500 may refer to elements mentioned above in connection with FIG. 1. In practice, portions of method 500 may be performed by different elements of the described system, e.g., processor 140, memory 150, biometric sensor 110, and cellular antenna 112. It should be appreciated that method 500 may include any number of additional or alternative tasks, the tasks shown in FIG. 2 need not be performed in the illustrated order, and method 500 may be incorporated into a more comprehensive procedure or process having additional functionality not described in detail herein.

During configuration of the wireless device 100, the biometric sensor 110 can be used to scan a uniquely-identifying aspect of an operator and store the biometric reading, or biometric information (task 510). The biometric reading can also be considered biometric information or a biometric scan for descriptive purposes, and the actual information recorded can vary by embodiment. Preferably, the biometric information obtained and stored is adequate to uniquely identify a human operator. In certain embodiments, the biometric sensor 110 can be a fingerprint scanner, and record information describing the fingerprint of a user as the biometric information. Other types of biometric information, such readings from optical scanners or voice recognition devices can also be used. Biometric information received during configuration can be designated as authorized, thereby providing a reference, or collection of references, against which later biometric scans can compare to determine if an operator of the wireless device 100 is authorized or not. During configuration, other parameters can be set as well, as will be described in greater detail below. The wireless device 100 can be configured multiple times, as desired, and different configuration parameters can be changed by the operator. Preferably, the configuration of the wireless device 100 is restricted to authorized operators.

After configuration, as part of the normal operation of the wireless device 100, its user interface can lock itself (task 520) immediately or after a designated amount of idle time. When locked, the wireless device 100 disables access to many of its features. Although many features of the wireless device 100 are blocked, in certain embodiments, various features can still be accessed, such as the capability to use the wireless device 100 to place a call to an emergency service. The wireless device 100 can enter the locked state after a period of non-use by an operator for a period of time configurable to each wireless device 100.

The wireless device 100 can be unlocked through several different techniques, including the entry of a personalized code using the input device 108 or submission of biometric information using the biometric sensor 110 (task 530). After the biometric sensor 110 receives biometric information, the wireless device 100 can compare the received biometric information to reference biometric information stored during initial configuration (task 540). For example, a fingerprint can be read from an operator attempting to unlock the wireless device 100. The wireless device 100 can then compare the fingerprint of the operator attempting to unlock the wireless device 100 with all stored fingerprints to determine if the operator is authorized to use the wireless device 100 or not.

After making the comparison, the wireless device 100 can reach a determination as to whether the operator is authorized (task 550). In the event that the newly-scanned biometric information matches or substantially matches a stored, reference authorized biometric record, the wireless device 100 can unlock itself for normal use (task 560).

If the wireless device 100 determines that the newly-scanned biometric information represents that of an unauthorized user, it can instead begin a sequence of steps aided to communicate the fact of its theft and provide its current location. In certain embodiments, multiple unauthorized scans in succession can be required before the wireless device 100 continues with the anti-theft features described below. During configuration, the number of successive unauthorized unlocking attempts required to initiate anti-theft features can be set, from as few as one to as many as desired. This feature may be desirable to ensure that "false alarms" are not generated in response to a mistaken keypad entry by an authorized user and/or due to an error in the biometric data analysis.

After the wireless device 100 determines that unauthorized use has been attempted the requisite number of times for anti-theft features, the wireless device 100 can then attempt to determine its location (task 570). Preferably, the wireless device 100 can use any suitable feature to determine its location. For example, the wireless device 100 can utilize the GPS receiver 116 to receive GPS signals, as described above. In the event the GPS receiver 116 has been disabled by the user, the wireless device 100 can, in certain embodiments, at least temporarily re-activate the GPS receiver 116 for use during anti-theft operations. Preferably, the wireless device 100 can record the event of determining use by an unauthorized operator in a non-volatile memory location. Thus, depriving the operating components of the wireless device of power, such as by removing a battery, fuel cell, or other power source, will not inhibit the wireless device 100 from remaining in the same locked and/or stolen state after power is restored.

Alternatively, the wireless device 100 can use other techniques to determine its current location, including use of the tracking and location data available from the cellular antenna 112. For example, the wireless device 100 can determine the nearest cellular communication antenna 200, as well as surrounding antennas, and their relative signal strengths. Additionally, if the wireless device is compliant with a wireless local area network protocol, such as the IEEE 802.11x family of protocols, it could initiate a locating routine that leverages known triangulation techniques carried out by the wireless access devices in the network environment.

In addition to determining its location using the locating techniques inherent to the hardware features of the wireless device 100, the wireless device 100 can also detect peripheral environmental data. Though not as useful in directly locating the wireless device 100, environmental data can be used by a person attempting to locate the wireless device 100 to expedite the search. For example, in certain embodiments, the wireless antenna 114 can detect nearby wireless service providers. In other embodiments where a camera or other optical imaging device is present, an image can be captured, potentially including location-identifying information, or information identifying the unauthorized user. Preferably, any information determined, such as position or environmental data, is stored in the wireless device 100.

The wireless device 100 also can perform other anti-theft operations. In certain embodiments, the wireless device 100 can engage a locking features inhibiting external access to its battery or other power source. For example, a movable feature, such as a solenoid, can be positioned by one of the components of the electronics module 120, locking a battery door or other access point. In some embodiments, the wireless device 100 can comprise a removable memory component, such as a Subscriber Identity Module (SIM) card. Other removable memory components can also be used in various embodiments of the wireless device. When performing anti-theft operations, the wireless device 100 can also disable access to any removable memory components. In certain embodiments, for example, a SIM card can be disposed near the battery and locking the battery compartment can inhibit access by the unauthorized user to both the battery as well as the SIM card.

Subsequent to data collection, including information indicating the location of the wireless device 100, the wireless device 100 can transmit a message including the information to a remote recipient (task 580). The remote recipient can be any designated recipient, preferably selected during configuration of the wireless device 100. For example, the owner of the wireless device 100 can configure that such information be transmitted to an alternative wireless device, to a service provider supporting the communication features of the wireless device 100, to a law enforcement agency, and so on.

Preferably, the remote recipient is contactable using features present in the wireless device 100. For example, the wireless device 100 can be configured to transmit a message containing the location information, such as longitude and latitude information obtained from the GPS receiver 116, using a Short Message Service (SMS) message. In some embodiments, the wireless device 100 can be configured to transmit an email to a remote address. In other embodiments, the information can be communicated using a proprietary messaging system and/or format. In certain embodiments, multiple transmission techniques can be used.

When transmitting the message, the wireless device 100 can include location information as described above, in addition to any peripheral environmental information. The wireless device 100 can include in the message other information as desired for the embodiment, including data regarding the biometric information provided by the unauthorized user or information regarding the power level remaining in the device. The message can be transmitted only once, once per transmission technique, or it can be repeatedly periodically at a frequency and for a length of time configurable to the wireless device 100.

In certain embodiments, the wireless device 100 can terminate its operation after performing the transmission. In other embodiments, the wireless device 100 can actively or periodically re-establish its current location using any of the techniques previously described. The new location data can be compared against the stored previous location to determine, if possible, the distance the wireless device 100 has moved from its previous location. If a previous location was determined using one technique, which later becomes unavailable, but a different technique is available, the distance the wireless device 100 has been moved can still be determined through appropriate approximation and/or conversion between techniques.

As one example, if the wireless device 100 previously determined its longitude and latitude using its GPS receiver 116, after a period of one hour, or any other predetermined length of time, the wireless device 100 can use the GPS receiver 116 to determine its current location. If the locations are different, the distance between them can be determined. In some embodiments, the wireless device 100 can be configured to transmit a new message every hour, regardless of movement of the wireless device 100. In other embodiments, the wireless device 100 can compare the distance moved to a predetermined distance to determine whether it has been moved a sufficient distance prior to sending a new message (task 590). For example, a wireless device 100 can be configured to require movement greater than 100 meters prior to sending a new message, or 10 meters, or 1 kilometer, or any other distance specified during configuration. In certain embodiments, the wireless device 100 can transmit a message even if the specified distance is not exceeded. In such embodiments, the original location can be retransmitted, or the newer location can be transmitted, or both.

In the event the wireless device 100 has moved a sufficient distance, it can transmit a new message to the remote recipient including the new location (task 600). Such location-updating can continue thereafter at regular intervals, as configured for the wireless device 100. The monitoring can continue until the wireless device 100 is recovered and the anti-theft features are disabled. In certain embodiments, location-determination and reporting functions can be configured to occur less frequently if the power level of the wireless device 100 decreases below certain thresholds.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of locating a wireless device being used by an unauthorized operator, the method comprising:
   examining biometric information of the operator of the wireless device;
   determining if the operator is authorized based on the biometric information;
   determining a first location information of the wireless device indicating its first position;
   storing the determination of authorization of the operator and further storing the determined first location information in a non-volatile memory in the wireless device, such that the determination and the first location information persists in the event of a loss of power to the wireless device;
   transmitting a first message to a remote recipient in response to determining the operator is not authorized, the first message including the biometric information of the operator and the first location information of the wireless device;
   determining a second location information of the wireless device indicating its second position;
   storing the determined second location information in the non-volatile memory; and
   transmitting a second message to the remote recipient in response to a movement of the wireless device, the second message including the biometric information of the operator and the second location of the wireless device that is different than the first location.

2. The method of claim 1, further comprising receiving the biometric information of the operator with a biometric reading device of the wireless device.

3. The method of claim 1, further comprising the steps of:
   the wireless device determining a location of itself in response to determining the operator is not authorized; and
   the wireless device transmitting the location of itself from the wireless device to the remote recipient.

4. The method of claim 3, further comprising periodically repeating transmission of the message.

5. The method of claim 3, wherein determining the location of the wireless device comprises using a Global Positioning System signal to determine the location.

6. The method of claim 3, wherein determining the location of the wireless device comprises receiving location information from a cellular communication antenna.

7. The method of claim 1, further comprising:
providing authenticated biometric information to the wireless device; and
associating the authenticated biometric information with an authorized operator of the wireless device.

8. The method of claim 1, wherein determining if the operator is authorized comprises comparing the biometric information to the authenticated biometric information.

9. The method of claim 1 further comprising:
capturing, by the wireless device, at least one image of environmental surroundings of the wireless device;
storing the at least one image in the non-volatile memory of the wireless device; and
transmitting the at least one image within the first message and the second message.

10. A method of providing a location of a wireless device, the method comprising:
determining that an operator of the wireless device is an unauthorized user based on biometric information of the operator;
storing the determination in a non-volatile memory in the wireless device, such that the determination persists in the event of a loss of power to the wireless device;
determining the initial location of the wireless device in response to the determining step;
storing the determined initial location of the wireless device in the non-volatile memory;
transmitting information including the biometric information of the operator and indicating the initial location of the wireless device; and
transmitting additional information in response to a movement of the wireless device, the additional information including the biometric information of the operator and indicating a different location of the wireless device that is different than the initial location.

11. The method of claim 10, further comprising recording the initial location of the wireless device.

12. The method of claim 11, further comprising determining an updated location of the wireless device after recording the initial location.

13. The method of claim 12, further comprising:
comparing the updated location to the initial location;
comparing a distance between the updated location and the initial location to a predetermined distance.

14. The method of claim 13, further comprising transmitting information indicating the updated location in response to detecting the distance is greater than the predetermined distance.

15. The method of claim 14, further comprising transmitting information indicating the initial location in response to detecting the distance is less than or equal to the predetermined distance.

16. The method of claim 14, further comprising recording the updated location of the wireless device.

17. The method of claim 10, wherein determining the operator of the wireless device is an unauthorized user comprises:
receiving a biometric scan with a biometric sensor of the wireless device; and
comparing the biometric scan to a collection of authorized biometric scans; and
determining the operator of the wireless device is an unauthorized user when the biometric scan is not contained in the collection of authorized biometric scans.

18. The method of claim 17, wherein determining at least one of the initial and the different location of the wireless device comprises using a Global Positioning System signal to determine at least one of the initial and the different location.

19. The method of claim 10, further comprising:
capturing, by the wireless device, at least one image of environmental surroundings of the wireless device;
storing the at least one image in the non-volatile memory of the wireless device; and
transmitting the at least one image within the first message and the second message.

20. A wireless device comprising:
a first wireless antenna adapted to communicate with a remote recipient;
a biometric sensor adapted to inspect an operator to create a first biometric reading;
a non-volatile memory device storing the first and a second biometric reading, a determined first and a second location information of the wireless device, such that the first and the second biometric readings, the first and the second location information persist in the event of a loss of power to the wireless device; and
a system controller coupled to and adapted to control the first wireless antenna and the biometric sensor, the system controller further adapted to receive information from the non-volatile memory device, to compare the first biometric reading to the second biometric reading, and to transmit biometric information indicating unauthorized use at the first location of the wireless device and additional biometric information in response to a movement of the wireless device to the different second location using the first wireless antenna when the first and second biometric readings are not substantially the same.

21. The wireless device of claim 20, further comprising a second wireless antenna, the system controller further adapted to determine a location of the wireless device with the second wireless antenna in response to determining the first and second biometric readings are incompatible and to transmit information indicating the location using the first wireless antenna.

22. The wireless device of claim 20, further comprising an image capturing device for capturing at least one image of environmental surroundings of the wireless device, wherein the non-volatile memory device stores the at least one image of the environmental surroundings, and further wherein the system controller is adapted to transmit the at least one image of the environmental surroundings.

* * * * *